United States Patent
Luo

(10) Patent No.: US 9,213,500 B2
(45) Date of Patent: Dec. 15, 2015

(54) DATA PROCESSING METHOD AND DEVICE

(71) Applicant: Huawei Technologies Co., Ltd., Shenzhen (CN)

(72) Inventor: Qingchao Luo, Chengdu (CN)

(73) Assignee: Huawei Technologies Co., Ltd., Shenzhen, Guangdong ( * ) Notice: Subject to any disclaimer, the term of this patent is extended or adjusted under 35 U.S.C. 154(b) by 164 days.

(21) Appl. No.: 13/909,180

(22) Filed: Jun. 4, 2013

(65) Prior Publication Data

US 2013/0275668 A1 Oct. 17, 2013

Related U.S. Application Data

(63) Continuation-in-part of application No. PCT/CN2012/085126, filed on Nov. 23, 2012.

(30) Foreign Application Priority Data

Apr. 11, 2012 (CN) .......................... 2011 1 0439201

(51) Int. Cl.
*G06F 12/00* (2006.01)
*G06F 3/06* (2006.01)

(52) U.S. Cl.
CPC .............. *G06F 3/0676* (2013.01); *G06F 3/061* (2013.01); *G06F 3/0656* (2013.01); *G06F 3/0689* (2013.01)

(58) Field of Classification Search
CPC ... G06F 3/0656; G06F 3/0689; G06F 3/0676; G06F 3/061
See application file for complete search history.

(56) References Cited

U.S. PATENT DOCUMENTS

| 2006/0193317 | A1 | 8/2006 | Rajagopalan et al. |
| 2008/0052432 | A1* | 2/2008 | Wilson et al. ................. 710/104 |
| 2008/0098148 | A1 | 4/2008 | McGee et al. |
| 2009/0328073 | A1 | 12/2009 | Tripathi |
| 2012/0079143 | A1 | 3/2012 | Krishnamurthi et al. |
| 2013/0254764 | A1* | 9/2013 | Bhogal et al. ...................... 718/1 |
| 2013/0346532 | A1* | 12/2013 | D'Amato et al. ............. 709/213 |

FOREIGN PATENT DOCUMENTS

| CN | 102073535 A | 5/2011 |
| CN | 102124449 A | 7/2011 |
| CN | 102609215 A | 7/2012 |

OTHER PUBLICATIONS

Foreign Communication From a Counterpart Application, European Application No. 12844648.1, Extended European Search Report dated Dec. 20, 2013, 6 pages.

Foreign Communication From a Counterpart Application, PCT Application PCT/CN2012/085126, International Search Report and Written Opinion, dated Feb. 28, 2013, 11 pages.

* cited by examiner

*Primary Examiner* — Kevin Verbrugge
*Assistant Examiner* — Alan Otto
(74) *Attorney, Agent, or Firm* — Conley Rose, P.C.; Grant Rodolph

(57) ABSTRACT

A data processing method, which includes: writing, by an application module, data to be written in a data buffer, and sending a write request command and an address of the data buffer to a Virtual Host Bus Adapter (VHBA); sending, by the VHBA, the write request command and the address of the data buffer to a storage array module; and acquiring, by the storage array module, the data to be written from the data buffer, and then writing, into the storage medium, the data to be written according to the address of the data to be written into the storage medium. In the embodiments, it is only required to transfer the address of the data buffer and the data to be written when writing the data, so memory copy is reduced and system performance is improved.

12 Claims, 4 Drawing Sheets

DATA PROCESSING METHOD AND DEVICE

CROSS-REFERENCE TO RELATED APPLICATIONS

This application is a continuation-in-part of International Application PCT/CN2012/085126, filed on Nov. 23, 2012, which claims priority to Chinese Patent Application No. 201110439201.8, filed on Apr. 11, 2012, both of which are entitled "Data Processing Method and Device" and incorporated herein by reference in their entirety.

FIELD

The present invention relates to the field of storage, and in particular, to a data processing method and device.

BACKGROUND

At present, a server and a storage device are connected by using a Fiber Channel (FC) or internet Small Computer System Interface (iSCSI) generally, and data interaction between the server and the storage is implemented based on a SCSI protocol. When needing to read data on the storage device, the server delivers a SCSI read command. A Host Bus Adapter (HBA) connected with the server converts the command into corresponding optical or electrical signals, and the optical or electrical signals are transmitted to the storage via an optical fiber or an Ethernet link. The storage converts the received signals into a small computer system interface (SCSI) command and returns a response result of the command to the server along an original channel after processing the command, thereby completing a read-write operation.

As the processing capacity of a central processing unit (CPU) is increasingly strong and cores are increasingly growing in number, the trend of putting the server and the storage into the same hardware system gets stronger and stronger, which not only may bring about advantages in cost and management, but also is of positive significance to the reduction of power consumption.

In the prior art, the server and the storage are quickly combined together by using a virtual machine solution. A virtual machine is a software stimulated complete computer system which has functions of a complete hardware system and operates in a fully isolated environment. Generally, the virtual machine may configure virtual hardware, install an operating system, and so on as needed.

Unification between the server and the storage may be implemented in one physical host by using the virtual machine, but because there are two virtual machines (the server and the storage each correspond to one virtual machine) in one physical host, there is a need to simulate the operation of two operating systems via the software, and to allocate memory for the two virtual machines. Therefore, a large amount of system resources are consumed. Meanwhile, memory copy during data transmission between the server and the storage also consumes a large amount of the system resources, so that the system performance is affected.

SUMMARY

Embodiments of the present invention provide a data processing method and device, which may enable a server and storage to run programs under the same operating system, thereby reducing consumption of resources. In addition, during data transmission, an address of processing data is transferred by using a virtual channel, so memory copy is reduced and system performance is improved.

A data processing method provided by an embodiment of the present invention includes: after receiving a write request command, writing, by a first application module, data to be written into a first data buffer, and sending a write request instruction and an address of the first data buffer to a first Virtual HBA (VHBA), where the write request instruction includes an address of the data to be written into a storage medium; sending, by the first VHBA, the write request instruction and the address of the first data buffer to a first storage array module; after receiving the write request instruction, acquiring, by the first storage array module, the data to be written from the first data buffer according to the address of the first data buffer, and then writing, into the storage medium, the data to be written according to the address of the data to be written into the storage medium; and returning, by the first storage array module, a response to the write request instruction to the first VHBA, and returning, by the first VHBA, the response to the write request instruction to the first application module.

Another data processing method provided by an embodiment of the present invention includes: sending, by a second application module, a read request instruction and an address of a second data buffer to a second VHBA, where the read request instruction includes an address of data to be read in a storage medium; sending, by the second VHBA, the read request instruction and the address of the second data buffer to a second storage array module; acquiring, by second storage array module, the data to be read according to the address of the data to be read in the storage medium carried in the read request instruction, and then writing the data to be read in the second data buffer according to the address of the second data buffer; and returning, by second storage array module, a response to the read request instruction to the second VHBA, and returning, by the second VHBA, the response to the read request instruction to the application module.

A data processing device provided by an embodiment of the present invention includes: a first application module, a first VHBA, a first data buffer and a first storage array module; the first application module writes, after receiving a write request command, data to be written into the first data buffer, and sends a write request instruction and an address of the first data buffer to the first VHBA, where the write request instruction includes an address of the data to be written into a storage medium; the first VHBA sends the write request instruction and the address of the first data buffer to the first storage array module; the first storage array module acquires, after receiving the write request instruction, the data to be written from the first data buffer according to the address of the first data buffer, and then writes, into the storage medium, the data to be written according to the address of the data to be written into the storage medium; and the first storage array module returns a response to the write request instruction to the first VHBA, and the first VHBA returns the response to the write request instruction to the first application module.

Another data processing device provided by an embodiment of the present invention includes: a second application module, a second VHBA, a second data buffer and a second storage array module; the second application module is configured to send a read request instruction and an address of the second data buffer to the second VHBA, where the read request instruction includes an address of data to be read in a storage medium; the second VHBA is configured to send the read request instruction and the address of the second data buffer to the second storage array module; the second storage array module is configured to acquire the data to be read according to the address of the data to be read in the storage medium, and then write the data to be read in the second data buffer according to the address of the second data buffer; and the second storage array module is further configured to return a response to the read request instruction to the second VHBA, and the second VHBA returns the response to the read request instruction to the second application module.

In the embodiments of the present invention, because the application module and the storage array module are in the same physical host, the application module and the storage array module may share one operating system through a VHBA. It is only required to transfer the address of the data buffer and the data to be written when writing the data, so memory copy is reduced and system performance is improved.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more clear, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
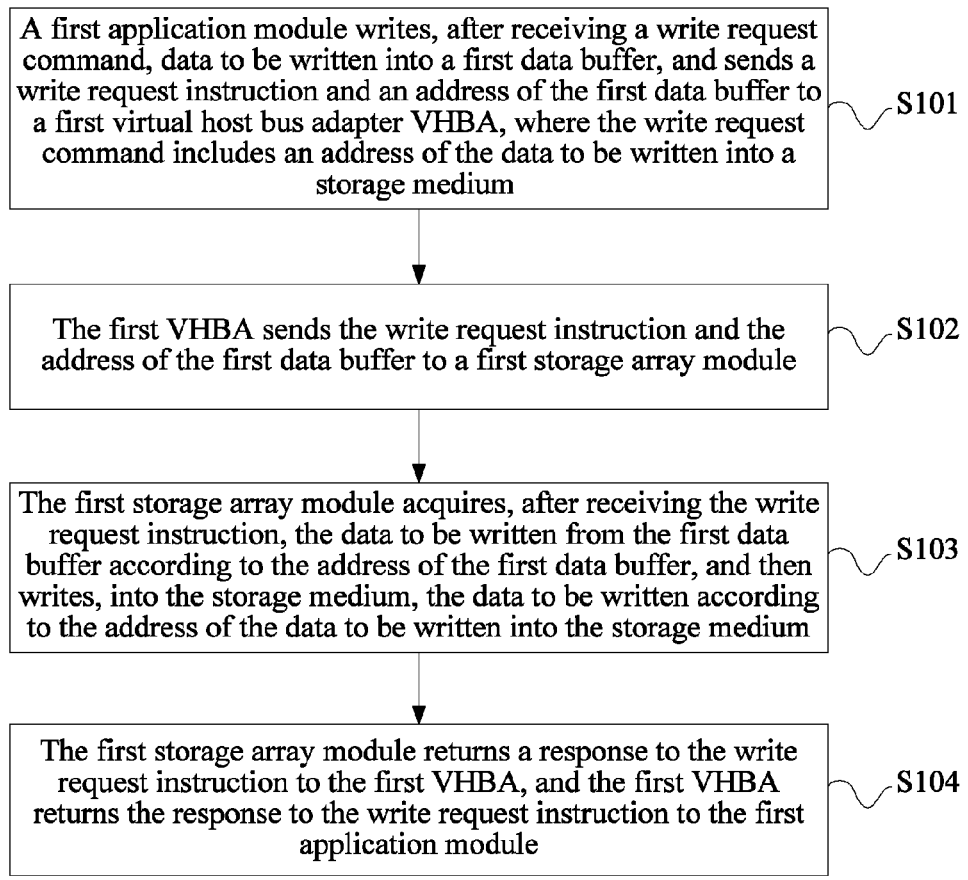
FIG. 1 is a flowchart of a data processing method according to an embodiment of the present invention.

Referring to FIG. 1, it is a data processing method provided by an embodiment of the present invention.

In the embodiment of the present invention, a first application module may include various applications and drivers, which exist in a physical host in the form of an application software stack. A first storage array module includes a target and array control software. The target is configured to receive a command sent by a first VHBA, resolve the command into a command identifiable to storage array software, and send the command to the storage array software. The first application module and the first storage array module are integrated in one physical host and connected via a first VHBA. The first VHBA enables the first application module and the first storage array module to form a virtual channel between them, and share the same operating system (OS).

The first storage array module is a storage array with a SCSI comprising a controller module and a plurality of disks. Specifically, the controller module is used to provide the first application module with the storage resources of the disks. The controller module is also used to execute the OS and the application programs provided by the first application module. The OS executed by the controller module is the same as the OS included in the first application module. That is to say, the first storage array module and the first application module share the same OS. In the first storage array module, multiple disks can be combined into a logical unit by use of redundant array of independent disks (RAID) technology. Data is distributed across the disks. For example, there are 4 disks in the first storage array module, after data is divided into 3 pieces, each piece of data can be stored into one of the disks. Checkout data computed according to the data can be stored into the fourth disk. If one of the disks is damaged, the piece of data stored in the disk can be recovered by the other piece of data and the checkout data. As described above, the controller module is provided the first application module with a logic storage space, which is from the physical storage space provided by the disks. As for the first application module, it cannot see the storage spaces of the disks directly.

The data processing method provided by the embodiment of the present invention specifically includes the following steps.

S101: A first application module writes, after receiving a write request command, data to be written into a first data buffer, and sends a write request instruction and an address of the first data buffer to a first VHBA, where the write request command includes an address of the data to be written into a storage medium.

The write request command includes the data to be written and the address of the data to be written into the storage medium, while the write request instruction includes the address of the data to be written into the storage medium, but not the data to be written.

The first application module may be an application software stack in the physical host, where it includes various applications and drivers. The first storage array module may be an array software stack in the physical host, where it includes a target and various types of array control software. The first application module and the first storage array module are connected via the first VHBA. The first VHBA is a software simulated HBA, which has functions of a physical HBA. The application software stack further includes the drivers of the first VHBA.

In the embodiment of the present invention, the first data buffer may be a memory in the physical host.

S102: The first VHBA sends the write request instruction and the address of the first data buffer to a first storage array module. In step of S102, the write request instruction and the address of the first data buffer can be sent to the controller module of the first storage array module.

S103: The first storage array module acquires, after receiving the write request instruction, the data to be written from the first data buffer according to the address of the first data buffer, and then writes, into the storage medium, the data to be written according to the address of the data to be written into the storage medium. The storage medium, such as a disk, is included in the first storage array module.

S104: The first storage array module returns a response to the write request instruction to the first VHBA, and the first VHBA returns the response to the write request instruction to the first application module.

In the prior art, an application virtual machine and a storage virtual machine use different operating systems respectively, so a mode of transferring an address cannot be adopted during data transfer, but only a mode of memory copy can be adopted. Specifically, the application virtual machine and the storage virtual machine occupy a part of the host memory respectively. When needing to write data in the storage medium, the application virtual machine writes the data to be written in the corresponding memory of the application virtual machine first. When sending a write data command to the storage virtual machine, the application virtual machine copies the data to be written in the memory thereof to the corresponding memory of the storage virtual machine, and then the storage virtual machine writes the data to be written into the storage medium after acquiring it from the memory thereof. Memory copy performed between the application virtual machine and the storage virtual machine consumes a large amount of system resources, thereby causing effects on system performance.

In the embodiment of the present invention, because the first application module and the first storage array module are in the same physical host, the first application module and the first storage array module may share one operating system through a first VHBA. It is only required to transfer the address of the data buffer and the data to be written when writing the data, so the memory copy is reduced and the system performance is improved.

Moreover, in the prior art, the virtual machine solution mainly supports a mode of accessing a storage system via iSCSI, but basically not FC. While in the embodiment of the present invention, because the application module and the storage array module are connected through the VHBA, the mode of accessing the storage system via the FC may be supported.

Figure 2:
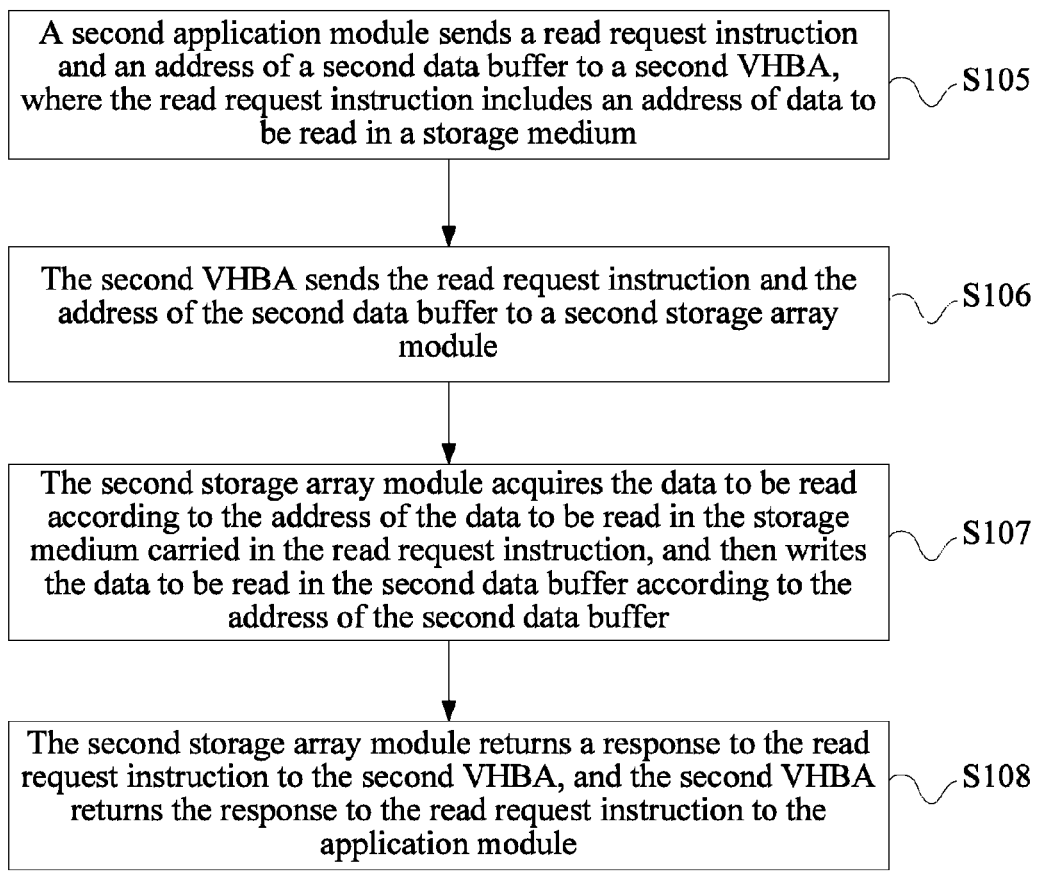
FIG. 2 is a flowchart of another data processing method according to an embodiment of the present invention.

Referring to FIG. 2, it is another data processing method provided by another embodiment of the present invention.

S105: A second application module which is the same as the first application module described above, sends a read request instruction and an address of a second data buffer to a second VHBA, where the read request instruction includes an address of data to be read in a storage medium.

S106: The second VHBA, which is the same as the first VHBA described above, sends the read request instruction and the address of the second data buffer to a second storage array module, wherein the second data buffer is the same as the first data buffer described above.

S107: The second storage array module, which is the same as the first storage array module described above, acquires the data to be read according to the address of the data to be read in the storage medium carried in the read request instruction, and then writes the data to be read in the second data buffer according to the address of the second data buffer.

S108: The second storage array module returns a response to the read request instruction to the second VHBA, and the second VHBA returns the response to the read request instruction to the second application module.

In the prior art, when needing to read data, the application virtual machine sends a read data request to the storage virtual machine. The storage virtual machine writes the data to be read in the memory after acquiring the data to be read according to the read data request, and then copies the data to be read in the memory thereof to the memory of the application virtual machine when responding to the read data request of the application virtual machine. Memory copy performed between the application virtual machine and the storage virtual machine consumes a large amount of system resources, thereby causing effects on system performance.

In the embodiment of the present invention, the second application module may include various applications and drivers, which exist in a physical host in the form of an application software stack. The second storage array module includes a target and array control software. The target is configured to receive a command sent by the second VHBA, resolve the command into a command identifiable to the storage array software, and send the command to the storage array software. The second application module and the second storage array module are in the same physical host and share one operating system. Only the address of the data buffer and the address of the data to be read are transferred when data is read, so that in the embodiment of the present invention, the integration of the application host and the storage system is implemented, and the memory copy is reduced and the system performance is improved.

Figure 3:
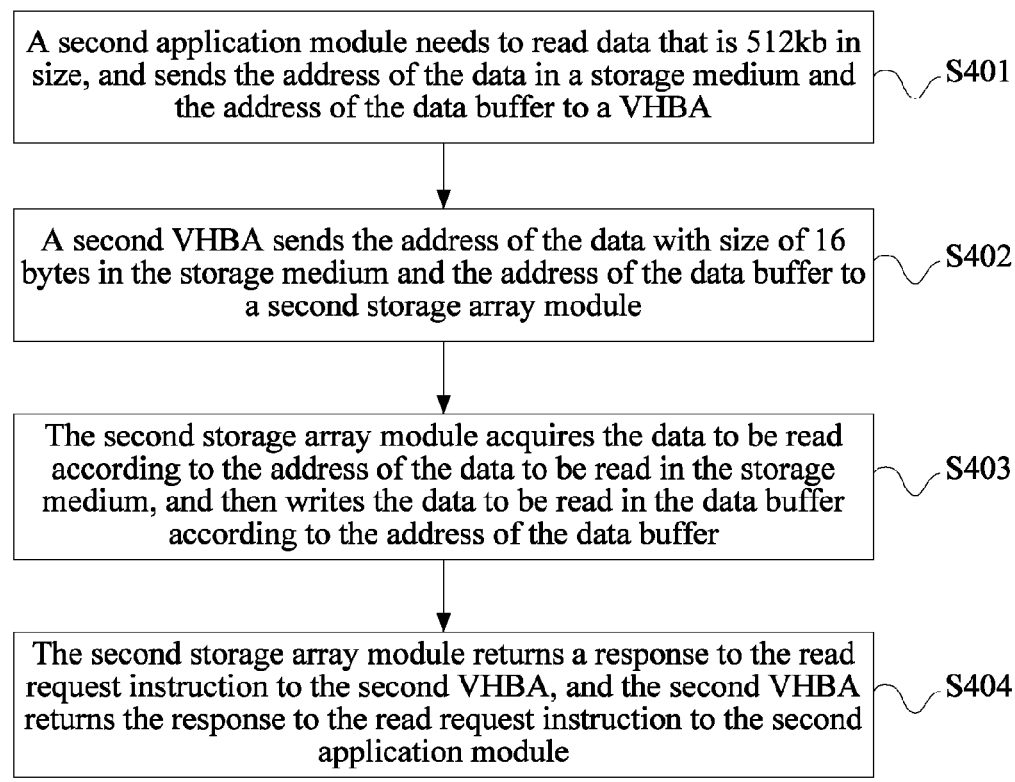
FIG. 3 is a flowchart of another data processing method according to an embodiment of the present invention.

Referring to FIG. 3, the following illustrates that the present invention only needs to transfer an address of a data buffer and an address of data to be read when data is read by one specific embodiment, so memory copy may be reduced and system performance may be improved.

S401: A second application module needs to read data that is 512 kilobytes (kb) in size, and sends the address of the data in a storage medium and the address of the data buffer to a second VHBA.

The address of the data in the storage medium and the address of the data buffer are both equal to offset plus length, with the size of 16 bytes in total.

S402: A second VHBA sends the address of the data with the size of 16 bytes in the storage medium and the address of the data buffer to a second storage array module.

S403: The second storage array module acquires the data to be read according to the address of the data to be read in the storage medium, and then writes the data to be read in the data buffer according to the address of the data buffer.

S404: The second storage array module returns a response to the read request instruction to the second VHBA, and the second VHBA returns the response to the read request instruction to the second application module.

It can be seen that in the embodiment of the present invention, the second application module and a second target module only need to transfer the address with the size of 16 bytes through the VHBA, thereby greatly reducing the memory copy and saving the system resources.

In another embodiment of the present invention, application to a unified storage system is possible. The unified storage system refers to a network storage architecture, which not only supports file-based Network Attached Storage (NAS) storage, but also supports block-based Storage Area Network (SAN) storage.

Specifically, in the embodiment of the present invention, the second application module and the second storage array module are integrated in one physical host. The second application module may include a file system and a file sharing protocol, and may provide a shared-file system to the outside; while the second storage array module may process a SCSI command directly to provide block services to the outside. Therefore, the embodiment of the present invention may be applied to a unified storage scenario.

Figure 4:
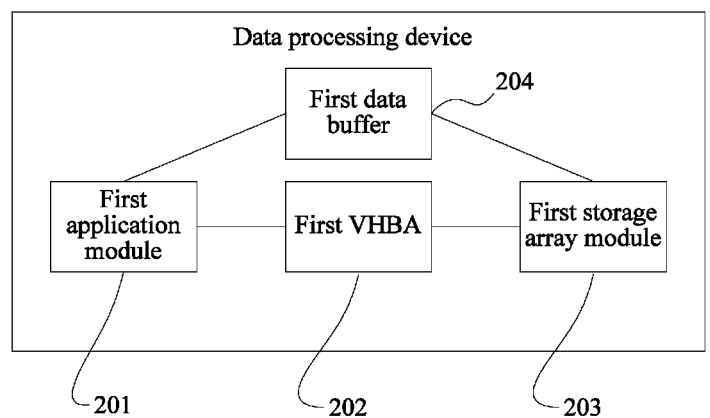
FIG. 4 is a schematic structural diagram of a data processing device according to an embodiment of the present invention.

Referring to FIG. 4, it is a data processing device provided by an embodiment of the present invention.

In the embodiment of the present invention, a first application module and a first storage array module are integrated in one physical host and connected via a first VHBA. The first VHBA enables the first application module and the first storage array module to form a virtual channel between them, and share one operating system.

The data processing device includes: a first application module 201, a first VHBA 202, a first storage array module 203 and a first data buffer 204.

The first application module 201 writes, after receiving a write request command, data to be written into the first data buffer 204, and sends a write request instruction and an address of the first data buffer 204 to the first VHBA 202, where the write request instruction includes an address of the data to be written into a storage medium.

The first application module 201 may be an application software stack in the physical host, where it includes various applications and drivers. The first storage array module may be an array software stack in the physical host, where it includes a target and various types of array control software. The target is configured to receive the write request command or a read request instruction sent by the VHBA, resolve the instruction into a command identifiable to array control software, and forward the command to the array control software. The first application module and the first storage array module are connected via the first VHBA 202. The first VHBA 202 is a software simulated HBA, which has functions of a physical HBA. The application software stack further includes the drivers of the first VHBA 202.

The first VHBA 202 is configured to send the write request instruction and the address of the first data buffer 204 to the first storage array module 203.

The first storage array module 203 is configured to acquire, after receiving the write request instruction, the data to be written from the first data buffer 204 according to the address of the first data buffer 204, and then write, into the storage medium, the data to be written according to the address of the data to be written into the storage medium.

The first storage array module 203 is further configured to return a response to the read request instruction to the first VHBA 202, and the first VHBA 202 returns the response to the read request instruction to the first application module 201.

In the embodiment of the present invention, because the first application module 201 and the first storage array module 203 are in the same physical host, the first application module 201 and the first storage array module 203 may share one operating system through the first VHBA 202. It is only required to transfer the address of the first data buffer 204 and the data to be written when writing the data, so the memory copy is reduced and the system performance is improved.

Figure 5:
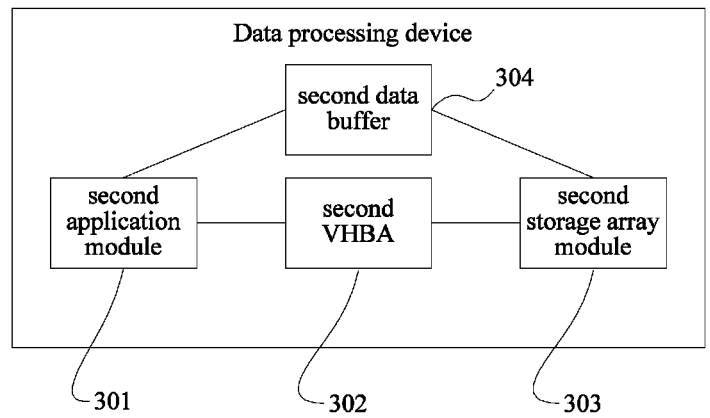
FIG. 5 is a schematic structural diagram of another data processing device according to an embodiment of the present invention.

Referring to FIG. 5, it is a data processing device provided by an embodiment of the present invention. The device includes: a second application module 301, a second VHBA 302, a second storage array module 303 and a second data buffer 304.

The second application module 301 is configured to send a read request instruction and an address of the second data buffer 304 to the second VHBA 302, where the read request instruction includes an address of data to be read in a storage medium.

The second VHBA 302 is configured to send the read request instruction and the address of the second data buffer 304 to the second storage array module 303.

The second storage array module 303 is further configured to acquire the data to be read according to the address of the data to be read in the storage medium, and then write the data to be read in the second data buffer 304 according to the address of the second data buffer 304.

The second storage array module 303 is further configured to return a response to the read request instruction to the second VHBA 302, and the second VHBA 302 returns the response to the read request instruction to the second application module 301.

In the embodiment of the present invention, the second application module 301 and the second storage array module 302 are in the same physical host and share one operating system. Only the address of the data buffer 304 and the address of the data to be read are transferred when data is read, so that in the embodiment of the present invention, the integration of the application host and the storage system is implemented, and the memory copy is reduced and the system performance is improved.

The foregoing descriptions are merely exemplary embodiments of the present invention, but are not intended to limit the patent scope of the present invention. Any equivalent structure or equivalent procedure transformation made using the specification and contents of the accompanying drawings of the present invention, or direct or indirect applications in other related technical fields shall all fall within the scope of patent protection of the present invention.

Persons of ordinary skill in the art should understand that all or part of the steps of the methods in the embodiments may be implemented by a program instructing relevant hardware. The program may be stored in a computer readable storage medium. The storage medium may be a read-only memory, a magnetic disk, or an optical disk.

The above describes in detail a method and device for determining energy consumption provided by the present invention. For persons of ordinary skill in the art, according to the concepts of the embodiments of the present invention, changes will be made to both the detailed description of the embodiments and the application range. Therefore, the contents of the specification shouldn't be regarded as limitation to the present invention.

What is claimed is:

1. A method, executed by a data processing device for storing data, wherein the data processing device comprises an application module, a Virtual Host Bus Adapter (VHBA), a data buffer, and a storage array module, wherein the storage array module shares an Operating System (OS) with the application module, wherein the storage array module comprises a controller module and a plurality of disks, and wherein the method comprises:

receiving, by the application module, data to be written and a first address indicating a storage space for storing the data;

writing, by the application module, the data into the data buffer;

sending, by the application module, a first address to the VHBA;

sending, by the application module, a second address indicating the data buffer storing the data to the VHBA;

forwarding, by the VHBA, the first address and the second address to the controller module;

obtaining, by the controller module, the data from the data buffer according to the second address; and storing, by the controller module, the data to one or more of the disks according to the first address.

2. The method according to claim 1, wherein the application module comprises an application software stack, and wherein the application software stack comprises applications and drivers.

3. The method according to claim 1, wherein the storage array module comprises a target and array control software.

4. The method according to claim 1, further comprising:

sending, by the application module, a third address of data stored in the disk to the VHBA;

forwarding, by the VHBA, the third address to the controller module;
sending, by the VHBA, a fourth address of the data buffer to the controller module;
obtaining, by the controller module, the data according to the third address;
moving, by the controller module, the data to the data buffer according to the fourth address; and
forwarding, by the VHBA, the data to the application module.

5. A data processing device, comprising:
an application module;
a Virtual Host Bus Adapter (VHBA);
a data buffer; and
a storage array module, wherein the storage array module is a storage array sharing a same Operating System (OS) with the application module, and wherein the storage array module comprises a controller module and a plurality of disks,
wherein the application module is configured to:
receive data to be written and a first address indicating a storage space for storing the data;
write the data into the first data buffer;
send the first address to the VHBA; and
send a second address indicating the data buffer storing the data to the VHBA,
wherein the VHBA is configured to forward the first address and the second address to the controller module of the storage array module, and
wherein the controller module is configured to obtain the data from the data buffer according to the second address and store the data to the disk according to the first address.

6. The device according to claim 5, wherein the application module comprises an application software stack, and wherein the application software stack comprises applications and drivers.

7. The device according to claim 5, wherein the storage array module comprises a target and array control software.

8. The device according to claim 5, wherein the application module is further configured to send a third address of data to the VHBA, wherein the VHBA is further configured to forward the third address to the controller module and send the fourth address of the data buffer to the controller module, wherein the controller module is further configured to obtain the data according to the third address and move the data to the data buffer according to the fourth address, and wherein the VHBA is further configured to forward the data to the application module.

9. A system comprising:
an application module;
a Virtual Host Bus Adapter (VHBA);
a data buffer; and
a storage array module, wherein the storage array module is a storage array sharing a same Operating System (OS) with the application module, and wherein the storage array module comprises a controller module and a memory,
wherein the application module is configured to:
receive data to be written and a first address indicating a storage space for storing the data;
write the data into the first data buffer;
send the first address to the VHBA; and
send a second address indicating the data buffer storing the data to the VHBA,
wherein the VHBA is configured to forward the first address and the second address to the controller module of the storage array module, and
wherein the controller module is configured to obtain the data from the data buffer according to the second address and store the data to the memory according to the first address.

10. The system according to claim 9, wherein the application module comprises an application software stack, and wherein the application software stack comprises applications and drivers.

11. The system according to claim 9, wherein the storage array module comprises a target and array control software.

12. The system according to claim 9, wherein the application module is further configured to send a third address of data to the VHBA, wherein the VHBA is further configured to forward the third address to the controller module and send the fourth address of the data buffer to the controller module, wherein the controller module is further configured to obtain the data according to the third address and move the data to the data buffer according to the fourth address, and wherein the VHBA is further configured to forward the data to the application module.

* * * * *